(12) United States Patent
Nakano et al.

(10) Patent No.: US 9,388,263 B2
(45) Date of Patent: Jul. 12, 2016

(54) (METH)ACRYLATE COPOLYMER AND METHOD FOR PRODUCING SAME

(71) Applicant: NIPPON SHOKUBAI CO., LTD., Osaka-shi, Osaka (JP)

(72) Inventors: Masato Nakano, Osaka (JP); Yuki Sano, Osaka (JP)

(73) Assignee: NIPPON SHOKUBAI CO., LTD., Osaka (JP)

(*) Notice: Subject to any disclaimer, the term of this patent is extended or adjusted under 35 U.S.C. 154(b) by 0 days.

(21) Appl. No.: 14/426,293

(22) PCT Filed: Oct. 2, 2013

(86) PCT No.: PCT/JP2013/076869
§ 371 (c)(1),
(2) Date: Mar. 5, 2015

(87) PCT Pub. No.: WO2014/054707
PCT Pub. Date: Apr. 10, 2014

(65) Prior Publication Data
US 2015/0252129 A1     Sep. 10, 2015

(30) Foreign Application Priority Data
Oct. 3, 2012 (JP) .................................. 2012-221494

(51) Int. Cl.
| | |
|---|---|
| C08F 220/06 | (2006.01) |
| C02F 5/10 | (2006.01) |
| C08F 2/38 | (2006.01) |
| C08F 216/14 | (2006.01) |
| C02F 5/00 | (2006.01) |

(52) U.S. Cl.
CPC ................. C08F 220/06 (2013.01); C02F 5/00 (2013.01); C02F 5/10 (2013.01); C02F 5/105 (2013.01); C08F 2/38 (2013.01); C08F 216/14 (2013.01)

(58) Field of Classification Search
CPC .............. C02F 5/00; C02F 5/10; C02F 5/105; C08F 2/38; C08F 216/14; C08F 220/06
USPC ....................................................... 526/287
See application file for complete search history.

(56) References Cited

U.S. PATENT DOCUMENTS

| | | |
|---|---|---|
| 2005/0001889 A1 | 1/2005 | Kato et al. |
| 2011/0245132 A1 | 10/2011 | Dupont et al. |
| 2011/0251115 A1 | 10/2011 | Dupont et al. |

FOREIGN PATENT DOCUMENTS

| | | |
|---|---|---|
| JP | 63-120709 | 5/1988 |
| JP | 2002-003536 | 1/2002 |
| JP | 2002003536 A * | 1/2002 |
| JP | 2004-217910 | 8/2004 |
| JP | 2004-307588 | 11/2004 |
| JP | 2004307588 A * | 11/2004 |
| JP | 2010-111792 | 5/2010 |
| JP | 2012-188586 | 10/2012 |
| JP | 2012188586 A * | 10/2012 |
| JP | 2012-224680 | 11/2012 |
| JP | 2013-212435 | 10/2013 |
| WO | 2010024448 | 3/2010 |

OTHER PUBLICATIONS

International Search Report for International Application No. PCT/JP2013/076869, mailed Jan. 7, 2014—4 pages.

* cited by examiner

*Primary Examiner* — Ling Choi
*Assistant Examiner* — Chun-Cheng Wang
(74) *Attorney, Agent, or Firm* — Hamre, Schumann, Mueller & Larson, P.C.

(57) ABSTRACT

Provided is a copolymer having excellent calcium ion trapping ability, calcium carbonate dispersing capacity, and gel resistance. A (meth)acrylic acid-based copolymer contains, as essential structural units, a structural unit (a) derived from a monomer represented by the following formula (1) in an amount of 2% by mole or more and 9% by mole or less, and a structural unit (b) derived from a (meth)acrylic acid (salt) in an amount of 91% by mole or more and 98% by mole or less, relative to 100% by mole of structural units derived from all monomers, wherein the copolymer contains a sulfonic acid (salt) group at least one end of the main chain and has a weight average molecular weight of 7000 to 100000,

[Chem. 1]

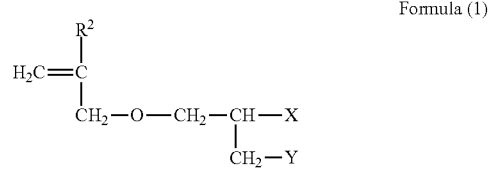

Formula (1)

wherein $R^2$ represents a hydrogen atom or a methyl group; and X and Y each independently represent a hydroxyl group or a sulfonic acid (salt) group (at least one of X and Y represents a sulfonic acid (salt) group).

5 Claims, No Drawings

(METH)ACRYLATE COPOLYMER AND METHOD FOR PRODUCING SAME

TECHNICAL FIELD

The present invention relates to a (meth)acrylic acid-based copolymer suitably used in agents such as dispersants and water treatment agents. The present invention also relates to a method for producing the (meth)acrylic acid-based copolymer.

BACKGROUND ART

Among water-soluble polymers such as polyacrylic acid and polymaleic acid, low molecular weight polymers have been suitably used in agents such as dispersants for inorganic pigments and metal ions, for example, and water treatment agents. For example, Patent Literature 1 discloses a (meth)acrylic acid-based copolymer containing a structural unit (a) derived from a (meth)acrylic acid-based monomer (A) having a specific structure, and a structural unit (b) derived from a monoethylenically unsaturated monomer (B) copolymerizable with the (meth)acrylic acid-based monomer (A), wherein a sulfonic acid group is present at least one end of the main chain (the sulfonic acid group may be an ammonium salt, alkali metal salt, or salt of an organic amine group); the structural unit (b) contains at least a structural unit (b1) derived from a (meth)allyl ether-based monomer (B1) having a specific structure; and the ratio between the structural unit (a) and the structural unit (b1) is as follows: 70 to 95% by mole of the structural unit (a) and 5 to 30% by mole of the structural unit (b1).

Patent Literature 2 discloses a (meth)acrylic acid-based copolymer containing, as essential structural units, a structural unit (a) derived from a monomer having a specific structure in an amount of 5% by mole or more and 22% by mole or less and a structural unit (b) derived from a (meth)acrylic acid (salt) in an amount of 78% by mole or more and 95% by mole or less, relative to 100% by mole of all structural units derived from all monomers, wherein a sulfonic acid (salt) group is present at least one end of the main chain, and the weight average molecular weight is 13000 to 50000.

Patent Literature 3 discloses a (meth)acrylic acid-based copolymer containing, as essential structural units, a structural unit (a) derived from a monomer having a specific structure in an amount of 5% by mole or more and 25% by mole or less, a structural unit (b) derived from a (meth)acrylic acid (salt) in an amount of 50% by mole or more and 88% by mole or less, and a structural unit (c) derived from maleic acid (salt) in an amount of 7% by mole or more and 25% by mole or less, relative to 100% by mole of structural units derived from all monomers, wherein the weight average molecular weight is 1000 to 30000.

PATENT LITERATURE

Patent Literature 1: JP 2002-3536 A
Patent Literature 2: JP 2012-188586 A
Patent Literature 3: JP 2012-224680 A

SUMMARY OF INVENTION

Technical Problem

While various types of polymers have been developed as described above, their application in water treatment, for example, faces an increasing problem of a reduction in heat-exchange efficiency due to generation and precipitation of calcium carbonate in heat exchangers and the like. Thus, there is an increasing demand for a polymer having better properties in terms of calcium ion trapping ability that suppresses generation of calcium carbonate, calcium carbonate dispersing capacity that suppresses precipitation of generated calcium carbonate, and anti-deposition properties (gel resistance) even in the presence of hardness components (e.g., calcium ion).

Thus, the present invention aims to provide a copolymer having excellent calcium ion trapping ability, calcium carbonate dispersing capacity, and gel resistance. The present invention also aims to provide a method for producing the copolymer.

Solution to Problem

The present inventors intensively studied various polymers and copolymers to solve the above problem. As a result, they found that a specific (meth)acrylic acid-based copolymer has excellent calcium ion trapping ability, calcium carbonate dispersing capacity, and gel resistance. The present invention is accomplished based on the above finding.

Specifically, a copolymer of the present invention is a (meth)acrylic acid-based copolymer containing, as essential structural units, a structural unit (a) derived from a monomer represented by the following formula (1) in an amount of 2% by mole or more and 9% by mole or less, and a structural unit (b) derived from a (meth)acrylic acid (salt) in an amount of 91% by mole or more and 98% by mole or less, relative to 100% by mole of structural units derived from all monomers, wherein the copolymer contains a sulfonic acid (salt) group at least one end of the main chain and has a weight average molecular weight of 7000 to 100000.

[Chem. 1]

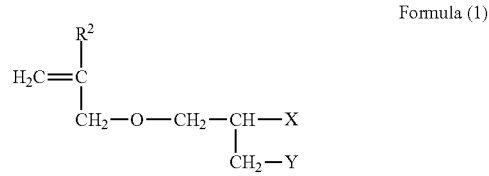

Formula (1)

In the formula (1), $R^2$ represents a hydrogen atom or a methyl group; and X and Y each independently represent a hydroxyl group or a sulfonic acid (salt) group (at least one of X and Y represents a sulfonic acid (salt) group).

Advantageous Effects of Invention

The copolymer of the present invention exhibits excellent calcium ion trapping ability, calcium carbonate dispersing capacity, and gel resistance, and thus can be suitably used in water treatment agents, particularly in calcium carbonate precipitation inhibitors.

DESCRIPTION OF EMBODIMENTS

The present invention is described in detail below.

A combination of two or more of preferred embodiments of the present invention described below is also a preferred embodiment of the present invention.

<(Meth)Acrylic Acid-Based Copolymer (Also Referred to as the Copolymer of the Present Invention)>

The copolymer of the present invention essentially contains a certain amount of a structural unit (a) derived from a monomer represented by the following formula (1).

[Chem. 2]

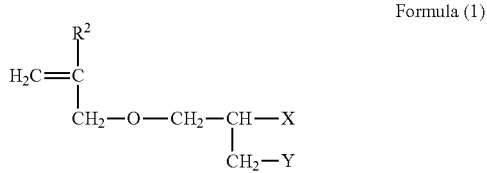

Formula (1)

In the formula (1), $R^2$ represents a hydrogen atom or a methyl group; and X and Y each independently represent a hydroxyl group or a sulfonic acid (salt) group (at least one of X and Y represents a sulfonic acid (salt) group).

The sulfonic acid (salt) refers to a sulfonic acid or a sulfonate.

The salt of the sulfonate is a metal salt, ammonium salt, or organic amine salt. Specific examples include alkali metal salts such as sodium salt, lithium salt, and potassium salt; alkaline earth metal salts such as magnesium salt and calcium salt; transition metal salts such as iron salt; alkanolamine salts such as monoethanolamine salt, diethanolamine salt, and triethanolamine salt; alkylamine salts such as monoethylamine salt, diethylamine salt, and triethylamine salt; salts of organic amines (e.g., polyamines) such as ethylenediamine salt and triethylenediamine salt. Among these, sodium salt or potassium salt is particularly preferred.

The structural unit (a) derived from a monomer represented by the formula (1) is specifically represented by the following formula (2).

[Chem. 3]

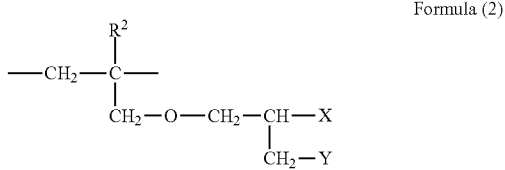

Formula (2)

In the formula (2), $R^2$, X, and Y are as defined above in the formula (1).

The phrase that the copolymer of the present invention contains "a structural unit (a) derived from a monomer represented by the formula (1)" means that the final polymer contains a structural unit represented by the above formula (2).

The copolymer of the present invention contains a specific amount of structural unit (a) derived from a monomer represented by the formula (1). This results in improved gel resistance. The structural unit (a), which does not contain an ester group or amide group, is highly stable under certain conditions during the production process of the polymer and the production process of various products containing the polymer, and thus can efficiently improve the gel resistance.

The copolymer of the present invention contains the structural unit (a) derived from a monomer represented by the formula (1) in an amount of 2% by mole or more and 9% by mole or less relative to 100% by mole of structural units derived from all monomers. The term "structural units derived from all monomers" as used herein refers to the structural unit (a) derived from a monomer represented by the formula (1), the structural unit (b) derived from a (meth)acrylic acid (salt), and a structural unit (e) derived from another monomer. If the amount of the structural unit (a) represented by the above formula (1) is in the above range, the copolymer tends to have excellent gel resistance, calcium ion trapping ability, and calcium carbonate dispersing capacity. If the amount of the structural unit (a) is less than the above range, the copolymer tends to have poor gel resistance. The amount of the structural unit (a) relative to 100% by mole of structural units derived from all monomers is more preferably 3% by mole or more and 8% by mole or less, still more preferably 4% by mole or more and 7% by mole or less, particularly preferably 4% by mole or more and 6% by mole or less.

<Structural Unit Derived from a (Meth)Acrylic Acid (Salt)>

The copolymer of the present invention essentially contains a certain amount of a structural unit (b) derived from a (meth)acrylic acid (salt) (also referred to as "monomer (B)").

The (meth)acrylic acid (salt) refers to an acrylic acid, acrylic acid salt, methacrylic acid, or methacrylic acid salt. The salt of the (meth)acrylic acid (salt) is a metal salt, ammonium salt, or organic amine salt, as is the case with the sulfonate. Likewise, a particularly preferred example of the (meth)acrylic acid (salt) is a sodium salt or potassium salt of a (meth)acrylic acid.

The structural unit (b) derived from a (meth)acrylic acid (salt) is a structure in which an unsaturated double bond of the (meth)acrylic acid (salt) is converted into a single bond. For example, if the (meth)acrylic acid (salt) is sodium acrylate, the structural unit (b) can be represented by —$CH_2$—CH(COONa)—. The phrase that the copolymer of the present invention contains "a structural unit (b) derived from a (meth)acrylic acid (salt)" means that the final polymer contains a structural unit in which an unsaturated double bond of the (meth)acrylic acid (salt) is replaced by a single bond.

The copolymer of the present invention essentially contains the structural unit (b) derived from a (meth)acrylic acid (salt) in an amount of 91% by mole or more and 98% by mole or less relative to 100% by mole of structural units derived from all monomers.

If the amount of the structural unit (b) derived from a (meth)acrylic acid (salt) is in the above range, the copolymer tends to have excellent gel resistance, calcium ion trapping ability, and calcium carbonate dispersing capacity.

The amount of the structural unit (b) relative to 100% by mole of structural units derived from all monomers is preferably 92% by mole or more and 97% by mole or less, more preferably 93% by mole or more and 96% by mole or less, particularly preferably 94% by mole or more and 96% by mole or less. If the amount of structural unit (b) derived from a (meth)acrylic acid (salt) is less than the above range, the copolymer tends to have poor calcium ion trapping ability and calcium carbonate dispersing capacity.

<Structural Unit Derived from Another Monomer>

The copolymer of the present invention may contain the structural unit (e) derived from another monomer (also referred to as "monomer (E)"), in addition to the structural unit (a) represented by the above formula (1) and the structural unit (b) derived from a (meth)acrylic acid (salt).

The another monomer is preferably a monomer copolymerizable with the structural unit (a) represented by the above formula (1) and/or (meth)acrylic acid (salt).

The another monomer may be a salt, and in this case, the salt is a metal salt, ammonium salt, or organic amine salt, as is the case with the sulfonate. Likewise, if it is a salt, a sodium salt or potassium salt is particularly preferred.

The structural unit derived from another monomer (e) is a structure in which an unsaturated double bond of the another monomer is converted into a single bond. For example, if the monomer (E) is methyl acrylate, the structural unit (e) derived from another monomer can be represented by —$CH_2$—CH($COOCH_3$)—. The phrase that the copolymer of the present invention contains "a structural unit (e) derived from another monomer" means that the final polymer contains a structural unit in which the another monomer's unsaturated double bond that participates in polymerization is replaced by a single bond.

The copolymer of the present invention may contain the structural unit (e) derived from another monomer in an amount of 0% by mole or more and 7% by mole or less relative to 100% by mole of structural units derived from all monomers. The term "structural units derived from all monomers" as used herein is as defined above. If the amount of the structural unit (e) derived from another monomer is more than the above range, the calcium ion trapping ability and calcium carbonate dispersing capacity tend to be low. If the amount of the structural unit (e) derived from another monomer is in the above range, such problems can be adequately suppressed. The amount of the structural unit (e) relative to 100% by mole of structural units derived from all monomers is preferably 0% by mole or more and 5% by mole or less, more preferably 0% by mole or more and 3% by mole or less, particularly preferably 0% by mole or more and 2% by mole or less.

The another monomer (E) is not particularly limited and is suitably selected depending on desired effects. Specific examples include unsaturated monocarboxylic acids and their salts other than the monomer (B), such as crotonic acid, α-hydroxyacrylic acid, α-hydroxymethyl acrylic acid, and their derivatives; unsaturated dicarboxylic acids and their salts such as itaconic acid, fumaric acid, maleic acid, and 2-methyleneglutaric acid; sulfonic acid group-containing monomers other than the monomer (A), such as vinyl sulfonic acid, 1-(meth)acrylamide-1-propanesulfonic acid, 2-(meth)acrylamide-2-propanesulfonic acid, 2-(meth)acrylamide-2-methyl-1-propanesulfonic acid, (meth)allyloxybenzene sulfonic acid, styrenesulfonic acid, sulfoethyl (meth)acrylate, sulfopropyl (meth)acrylate, (meth)allylsulfonic acid, isoprenesulfonic acid, and their salts; monomers obtained by adding an alkylene oxide to (meth)allyl alcohol and isoprenol and polyalkylene glycol chain-containing monomers such as alkoxyalkylene glycol (meth)acrylates; N-vinyl monomers such as N-vinylpyrrolidone, N-vinylformamide, N-vinylacetamide, N-vinyl-N-methylformamide, N-vinyl-N-methylacetamide, and N-vinyloxazolidone; amide-based monomers such as (meth)acrylamide, N,N-dimethylacrylamide, and N-isopropyl acrylamide; (meth)allyl alcohol; isoprene-based monomers such as isoprenol; (meth)acrylic acid alkyl ester-based monomers such as butyl(meth)acrylate, 2-ethylhexyl (meth)acrylate, and dodecyl (meth)acrylate; hydroxyalkyl (meth)acrylate-based monomers such as 2-hydroxyethyl (meth)acrylate, 2-hydroxypropyl (meth)acrylate, 2-hydroxybutyl (meth)acrylate, 4-hydroxybutyl (meth)acrylate, and 2-hydroxyhexyl (meth)acrylate; vinylaryl monomers such as styrene, indene, and vinylaniline, isobutylene, vinyl acetate; vinyl aromatic amino group-containing monomers having a heterocyclic aromatic hydrocarbon group and an amino group (such as vinylpyridine or vinylimidazole), and their quaternized forms and salts; aminoalkyl (meth)acrylates such as dimethylaminoethyl acrylate, dimethylaminoethyl methacrylate, dimethylaminopropyl acrylate, and aminoethyl methacrylate, and their quaternized forms and salts; allylamines such as diallylamine and diallyldimethylamine, and their quaternized forms and salts; and monomers obtained by reacting (ii) an amine such as a dialkylamine (e.g., dimethylamine, diethylamine, diisopropylamine, or di-n-butylamine), an alkanolamine (e.g., diethanolamine or diisopropanolamine), an aminocarboxylic acid (e.g., iminodiacetic acid or glycine), or a cyclic amine (e.g., morpholine or pyrrole) with (i) an epoxy ring of (meth)allyl glycidyl ether, isoprenyl glycidyl ether, or vinyl glycidyl ether, and their quaternized forms and salts.

These examples of the another monomer (E) may be used alone or in combination of two or more thereof.

<Other Structural Unit(s)>

The copolymer of the present invention characteristically contains a sulfonic acid (salt) group at least one end of the main chain of the polymer molecule. The phrase that the copolymer contains "a sulfonic acid (salt) group at least one end of the main chain" means that the copolymer contains a sulfonic acid (salt) group at one or more ends of the main chain. For example, a linear polymer molecule may contain sulfonic acid (salt) groups at two ends of the main chain; and a branched polymer molecule may contain sulfonic acid (salt) groups at three or more ends of the main chain. The presence of a sulfonic acid (salt) group at least one end of the main chain is preferred because it tends to improve the gel resistance. The amount (% by mass) of the sulfonic acid group at the end (s) of the main chain of the polymer molecule is preferably 0.01% by mass or more and 5% by mass or less relative to 100% by mass in total of the copolymer. The amount (% by mass) of the sulfonic acid group at the end (s) of the main chain of the polymer molecule relative to the total mass of the copolymer is to be calculated as acid equivalents.

The term "the main chain of a poly(meth)acrylic acid-based polymer" as used herein refers to a structural portion formed by polymerization of a carbon-carbon double bond site in the formula (1), an unsaturated double bond site in the monomer (B), and an unsaturated double bond site in the monomer (E) (if the monomer (E) is contained), where the atoms forming these sites are continuously bonded.

A structural unit containing a sulfonic acid group at least one end of the main chain of the copolymer is preferably formed by a method for polymerizing a monomer component essentially containing the monomers (A) and (B) in the presence of a bisulfite (salt) (such as sulfurous acid, bisulfite, dithionous acid, metabisulfite, or a salt thereof). In the above case, the bisulfite (salt) acts as a chain transfer agent or the like, whereby the sulfonic acid group is incorporated into the polymer molecule.

The sulfonic acid group at the end(s) of the main chain of the copolymer can be measured by, for example, $^1$H-NMR or the like.

<Molecular Weight of (Meth)Acrylic Acid-Based Copolymer>

The (meth)acrylic acid-based polymer of the present invention has a weight average molecular weight Mw of 7000 to 100000, preferably 7500 to 30000, more preferably 8000 to 25000, still more preferably 8500 to 20000, particularly preferably 9000 to 15000. If the weight average molecular weight is in the above range, the (meth)acrylic acid-based polymer tends to have improved calcium ion trapping ability, calcium carbonate dispersing capacity, and gel resistance. Thus, the (meth)acrylic acid-based polymer can be more suitably used in anti-scaling agents and the like. A (meth)acrylic acid-based polymer having a weight average molecular weight of less than 500 tends to have poor gel resistance due to factors such as an increase in the amount of a polymer not containing the structural unit (a).

In addition, the (meth)acrylic acid-based polymer of the present invention preferably has a degree of dispersion (Mw/Mn) of 1.5 to 10.0. The degree of dispersion is preferably 1.8 to 8.0, still more preferably 2.0 to 6.0, particularly preferably 2.3 to 3.5. If the degree of dispersion is less than 1.5, the synthesis will be difficult; whereas if the degree of dispersion is more than 10.0, the properties tend to be poor due to a decrease in the amount of components that contribute to the properties. If the degree of dispersion is 1.5 to 10.0, these problems can be adequately suppressed.

The weight average molecular weight (Mw) and the number average molecular weight (Mn) are measured by methods mentioned in examples described below.

<Gel Resistance of (Co)Polymer>

The gel resistance of the present invention is evaluated by the following gel resistance test.

(Gel Resistance Test)

(1) To a 500-mL tall beaker were sequentially added pure water, a boric acid-sodium borate pH buffer, an aqueous solution of the copolymer, and a calcium chloride solution so as to prepare a test solution containing the copolymer (a solids concentration of 100 mg/L) and having a calcium concentration of 150 mg $CaCO_3$/L and a pH of 8.5.

(2) The tall beaker in (1) is sealed with a polyvinylidene chloride film and allowed to stand in a constant temperature bath at 90° C. for one hour.

(3) The gel resistance is evaluated based on the occurrence of precipitation. The precipitation indicates that the gel resistance is noticeably low.

(4) If no precipitation occurs, the test solution is stirred and placed in a quartz cell with a 5-cm light path. Then, an absorbance (a) is measured at a UV wavelength of 380 nm with a spectrophotometer (UV-1800 available from Shimadzu Corporation). A test solution as a blank solution is prepared in the same manner as the above test solution except for not adding a calcium chloride solution. An absorbance (b) is measured in the same manner, and the degree of gelation is determined by the following formula:

Degree of gelation=(*a*)−(*b*).

A lower degree of gelation indicates higher gel resistance. The copolymer of the present invention preferably has a degree of gelation of 0.070 or less. The copolymer having a degree of gelation in the above range can be preferably used as an additive such as a water treatment agent or the like even in the presence of calcium. The degree of gelation is more preferably 0.060 or less, still more preferably 0.050 or less.

The lower limit of the degree of gelation is not particularly limited. For example, the degree of gelation of gelation is 0.000 or more.

<Calcium Ion Trapping Ability of (Co)Polymer>

The (meth)acrylic acid-based copolymer of the present invention exhibits excellent calcium trapping ability. The calcium ion trapping ability (mg $CaCO_3$/g) is defined as the number of milligrams of calcium ions in terms of calcium carbonate trapped in 1 g of water-soluble polymer. It is an index that indicates how many calcium ions in water are trapped in the water-soluble polymer. For example, when added to a water treatment agent, the (meth)acrylic acid-based copolymer traps calcium ions in water or is adsorbed on the crystal nuclei that form scale, and thus can suppress scale formation or growth.

In the present invention, the calcium ion trapping ability is a value measured by a method described below.

(Method for Measuring Calcium Trapping Ability)

(1) A 0.001 mol/L calcium chloride aqueous solution (50 g) is placed in a 100 cc beaker, and the copolymer (10 mg in terms of solids content) is added to the beaker.

(2) Next, the pH of the aqueous solution of (1) is adjusted to 9 to 11 with dilute sodium hydroxide.

(3) Subsequently, a 4 mol/L potassium chloride aqueous solution (1 ml) is added as a calcium ion electrode stabilizer to the aqueous solution of (2) under stirring.

(4) An ion analyzer (EA 920 model available from Orion Research Inc.) and a calcium ion electrode (93-20 model available from Orion Research Inc.) are used to measure free calcium ions, and calculation is performed to determine how many milligrams of calcium ions in terms of calcium carbonate are chelated per gram of copolymer (calcium ion trapping ability as a chelating ability). The unit of the calcium ion trapping ability is "mg $CaCO_3$/g".

The copolymer of the present invention preferably has a calcium ion trapping ability of 200 mg $CaCO_3$/g or more. The copolymer having a calcium ion trapping ability in the above range can be preferably used as an additive such as a water treatment agent or the like even in the presence of calcium. The calcium ion trapping ability is more preferably 210 mg $CaCO_3$/g or more, still more preferably 230 mg $CaCO_3$/g or more. The upper limit of the calcium ion trapping ability is not particularly limited. For example, the calcium ion trapping ability is 500 mg $CaCO_3$/g or less.

<Calcium Carbonate Dispersing Capacity>

The (meth)acrylic acid-based copolymer of the present invention exhibits excellent calcium carbonate dispersing capacity. The copolymer of the present invention, which exhibits excellent calcium carbonate dispersing capacity, can suppress generation and growth of calcium carbonate scale in a cooling water system as well as precipitation of calcium carbonate scale on a heat exchanger.

In the present invention, the calcium carbonate dispersing capacity is a value measured by the following method under the following conditions.

(Method for Measuring Calcium Carbonate Dispersing Capacity)

(1) Calcium carbonate (0.3 g, Wako 1st grade available from Wako Pure Chemical Industries, Ltd.) is placed in a test tube (available from IWAKI GLASS Co., Ltd., diameter of 18 mm, height of 180 mm). Subsequently, a boric acid-sodium borate pH buffer, pure water, and an aqueous solution of the copolymer are sequentially added to the test tube in such a manner that the total amount including the calcium carbonate is 30.3 g. Thereby, a dispersibility test solution containing the copolymer (solids concentration of 50 mg/L) and having a pH of 8.5 is prepared.

(2) After the test tube of (1) is hermetically sealed with a cover, the test tube is shaken to uniformly disperse calcium carbonate.

(3) The test tube is allowed to stand at room temperature (about 20° C.) for two hours, and then 5 mL of the supernatant of the dispersion is collected with a volumetric pipette.

(4) The absorbance (ABS) of the collected liquid in a 1-cm cell is measured using a UV spectrophotometer (UV-1800 available from Shimadzu Corporation) at a wavelength of 380 nm. The measured value is regarded as the calcium carbonate dispersing capacity.

A higher value of the calcium carbonate dispersing capacity indicates a higher dispersing capacity. The copolymer of the present invention preferably has a calcium carbonate dispersing capacity of 0.44 or more. The copolymer having a calcium carbonate dispersing capacity in the above range can be suitably used as an additive such as a water treatment agent or the like. The calcium carbonate dispersing capacity is more preferably 0.48 or more, more preferably 0.53 or more.

The upper limit of the calcium carbonate dispersing capacity is not particularly limited. For example, the calcium carbonate dispersing capacity is 0.80 or less.

<Method for Producing (Meth)Acrylic Acid-Based Copolymer>

A method for producing the copolymer of the present invention is a method for producing a (meth)acrylic acid-based copolymer, the method including copolymerizing, as essential starting materials, a monomer represented by the following formula (1) in an amount of 2% by mole or more and 9% by mole or less, and a (meth)acrylic acid (salt) in an amount of 91% by mole or more and 98% by mole or less, relative to 100% by mole of all monomers, in the presence of a bisulfite (salt).

[Chem. 4]

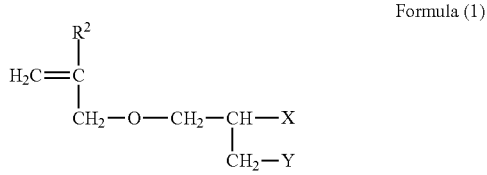

Formula (1)

In the formula (1), $R^2$ represents a hydrogen atom or a methyl group; and X and Y each independently represent a hydroxyl group or a sulfonic acid (salt) group (at least one of X and Y represents a sulfonic acid (salt) group).

<Monomer Composition>

The method for producing the copolymer of the present invention is a method including copolymerizing a monomer component essentially containing a monomer (monomer (A)) represented by formula (1) in an amount of 2% by mole or more and 9% by mole or less relative to 100% by mole of all monomers used (the total of the monomers (A), (B), and (E)) and a (meth)acrylic acid (salt) (monomer (B)) in an amount of 91% by mole or more and 98% by mole or less relative to 100% by mole of all monomers used.

In the method for producing the copolymer of the present invention, one or more kinds of the monomer (A) and one or more kinds of the monomer (B) may be used. In the method for producing the copolymer of the present invention, the another monomer (E) may be also copolymerized as need, in addition to copolymerization of the monomer (A) and the monomer (B).

In the method for producing the copolymer of the present invention, the amount of the monomer (E) used is preferably 0% by mole or more and 7% by mole or less relative to 100% by mole of all monomers (the total of the monomers (A), (B), and (E)). When using the monomer (E) as the optional component, one or more kinds of the monomer (E) may be used.

In the method for producing the copolymer of the present invention, the compositional ratio of the monomers used to produce the copolymer is more preferably as follows: 3% by mole or more and 8% by mole or less of the monomer (A), 92% by mole or more and 97% by mole or less of the monomer (B), and 0 to 5% by mole of the monomer (E), relative to 100% by mole of all monomers, so that the resulting copolymer exhibits better calcium ion trapping ability, calcium carbonate dispersing capacity, and gel resistance. A more preferred composition ratio is as follows: 4% by mole or more and 7% by mole or less of the monomer (A), 93% by mole or more and 96% by mole or less of the monomer (B), and 0 to 3% by mole of the monomer (E); and a particularly preferred composition ratio is as follows: 4% by mole or more, 6% by mole or less of the monomer (A), 94% by mole or more and 96% by mole or less of the monomer (B), and 0 to 2% by mole of the monomer (E). The total amount of the monomers (A), (B), and (E) is 100% by mole.

<Polymerization Initiator>

The method for producing the copolymer of the present invention preferably includes polymerizing the monomers (A), (B), and (E) (also sometimes referred to as a "monomer composition") in the presence of a polymerization initiator.

A known polymerization initiator may be used. Examples include hydrogen peroxide; persulfates such as sodium persulfate, potassium persulfate, and ammonium persulfate; azo-based compounds such as dimethyl 2,2'-azobis(2-methylpropionate), 2,2'-azobis(isobutyronitrile), 2,2'-azobis(2-methylbutyronitrile), 2,2'-azobis(2,4-dimethylvaleronitrile), 2,2'-azobis(4-methoxy-2,4-dimethylvaleronitrile), dimethyl 2,2'-azobis(isobutyrate), 4,4'-azobis(4-cyanovaleric acid), 2,2'-azobis(2-methylpropionamidine)dihydrochloride, 2,2'-azobis[N-(2-carboxyethyl)-2-methylpropionamidine]n-hydrate, 2,2'-azobis[2-(2-imidazolin-2-yl)propane]dihydrochloride, 2,2'-azobis[2-(2-imidazolin-2-yl)propane]disulfate dihydrate, and 1,1'-azobis(cyclohexane-1-carbonitrile); and organic peroxides such as benzoyl peroxide, lauroyl peroxide, peracetic acid, di-t-butylperoxide, and cumene hydroperoxide. Among these polymerization initiators, a persulfate is preferably used as described below because the resulting polymer tends to have improved gel resistance.

The amount of the polymerization initiator used is not particularly limited as long as polymerization of the monomers (A) and (B), as well as the monomer (E) if necessary, can be initiated. Yet, unless otherwise specified, the amount of the polymerization initiator is usually 15 g or less, preferably 0.5 to 10 g, more preferably 1 to 2 g per mole of a total monomer component including the monomers (A) and (B), as well as the monomer (E) if necessary.

<Chain Transfer Agent>

The method for producing the copolymer of the present invention is a method for copolymerizing the monomer component essentially including the monomers (A) and (B) in the presence of a bisulfite (salt). Specific examples of the bisulfite (salt) include sulfurous acid, bisulfite, dithionous acid, metabisulfite, and their salts (such as sodium bisulfite, potassium bisulfite, sodium dithionite, potassium dithionite, sodium metabisulfite, and potassium metabisulfite). Thereby, a sulfonic acid group can be efficiently introduced into at least one end of the main chain of the resulting copolymer, making it possible to further improve the calcium ion trapping ability, calcium carbonate dispersing capacity, and gel resistance. In addition, use of the bisulfite (salt) as a chain transfer agent can improve the color tone of the copolymer (composition).

The method for producing the copolymer of the present invention may use, as a molecular weight modifier of the polymer, a chain transfer agent other than the bisulfite (salt) as needed, as long as it does not adversely affect polymerization. Specific examples of the chain transfer agent other than the bisulfite (salt) include thiol-based chain transfer agents such as mercaptoethanol, thioglycerol, thioglycolic acid, 2-mercaptopropionic acid, 3-mercaptopropionic acid, thiomalic acid, octyl thioglycolate, octyl 3-mercaptopropionate, 2-mercaptoethane sulfonic acid, n-dodecylmercaptan, octylmercaptan, and butyl thioglycolate; halides such as carbon tetrachloride, methylene chloride, bromoform, and bromotrichloroethane; secondary alcohols such as isopropanol and glycerin; and phosphorous acid, hypophosphorous acid, and their salts (such as sodium hypophosphite and potassium hypophosphite).

These examples of the chain transfer agent may be used alone or in combination of two or more thereof.

Use of the chain transfer agent can advantageously suppress an unnecessary increase in the molecular weight of a polymer to be produced, allowing efficient production of a low molecular weight copolymer.

In the production method of the present invention, the amount of the chain transfer agent added is not limited as long as the monomers (A) and (B), as well as another monomer (E) if necessarily, can be successfully polymerized. Unless otherwise specified, the amount is usually 1 to 20 g, preferably 1.5 to 10 g, more preferably 2 to 4 g per mole of the total monomer component including the monomers (A) and (B), as well as the another monomer (E) if necessary.

<Preferred Combination of Initiator and Chain Transfer Agent (Also Referred to as "Initiator System")>

The method for producing the copolymer of the present invention preferably uses a combination of at least one persulfate and at least one bisulfite (salt) as the initiator system. Thereby, a sulfonic acid group can be efficiently introduced into at least one end of the main chain of the polymer, providing a low molecular weight water-soluble polymer having better calcium ion trapping ability, calcium carbonate dispersing capacity, and gel resistance, and allowing the polymer to effectively exhibit the effects of the present invention. In addition to the persulfate, adding a bisulfite (salt) to the initiator system can suppress an unnecessary increase in the molecular weight of a polymer to be produced, allowing efficient production of a low molecular weight copolymer.

Specific examples of the persulfate include sodium persulfate, potassium persulfate, and ammonium persulfate.

In the present invention, examples of the bisulfite (salt) are as described above. Among these examples, sodium bisulfite, potassium bisulfite, or ammonium bisulfite is preferred.

In the case of using the persulfate and the bisulfite (salt) in combination, the amount of the bisulfite (salt) is 0.1 to 5 parts by mass, preferably 1.0 to 4 parts by mass, more preferably 2.0 to 2.5 parts by mass, per part by mass of the persulfate. If the amount of the bisulfite (salt) is less than 0.1 parts by mass per part by mass of the persulfate, the bisulfite (salt) tends to have less effect. Thus, the amount of the sulfonic acid group to be introduced into the end (s) of the polymer tends to decrease, and the copolymer thus tends to have poor gel resistance. In addition, the weight average molecular weight of the (meth)acrylic acid-based copolymer tends to increase. In contrast, if the amount of the bisulfite (salt) is more than 5 parts by mass per part by mass of the persulfate, the effect of the bisulfite (salt) will not correspond to the amount added, and the bisulfite (salt) tends to be excessively supplied (wasted) to the polymerization system. Thus, the excess bisulfite (salt) may be decomposed in the polymerization system, generating a large amount of sulfur dioxide ($SO_2$ gas). In addition, the resulting (meth)acrylic acid-based copolymer will contain a large amount of impurities and thus tends to have poor properties. Further, impurities tend to be easily deposited during storage at low temperatures.

In the case of using the persulfate and the bisulfite (salt), the total amount of the persulfate and the bisulfite (salt) added is 2 to 20 g, preferably 3 to 10 g, more preferably 4 to 6 g, per mole of the monomer. If the amount of the persulfate and the bisulfite (salt) added is less than 2 g, the molecular weight of the resulting polymer tends to increase. In addition, the amount of the sulfonic acid group to be introduced into the end(s) of the resulting (meth)acrylic acid-based copolymer tends to decrease. In contrast, if the amount added is more than 20 g, the effects of the persulfate and the bisulfite (salt) will not correspond to the amount added, and adversely, the purity of the resulting (meth)acrylic acid-based copolymer tends to decrease.

The persulfate may be dissolved in a solvent (preferably water), which is described later, and added in the form of a persulfate solution (preferably an aqueous solution). The concentration of the persulfate solution (preferably aqueous solution) is 1 to 35% by mass, preferably 5 to 35% by mass, more preferably 10 to 30% by mass. If the concentration of the persulfate solution is less than 1% by mass, the concentration of the resulting product will be low, which creates difficulties in transportation and storage. In contrast, if the concentration of the persulfate solution concentration is more than 35% by mass, handling will be difficult.

The bisulfite (salt) may be dissolved in a solvent (preferably water), which is described later, and added in the form of a bisulfite (salt) solution (preferably an aqueous solution). The concentration of the bisulfite (salt) solution (preferably an aqueous solution) is 10 to 42% by mass, preferably 20 to 42% by mass, more preferably 32 to 42% by mass. If the concentration of the bisulfite (salt) solution is less than 10% by mass, the concentration of the resulting product will be low, which creates difficulties in transportation and storage. In contrast, if the concentration of the bisulfite (salt) solution concentration is more than 42% by mass, handling will be difficult.

<Other Additives>

In the method for producing the copolymer of the present invention, other suitable additives besides the initiator and the chain transfer agent can be added in a suitable amount to the polymerization system during polymerization of the monomers in an aqueous solution, as long as these additives do not impair the effects of the present invention. For example, a heavy metal concentration adjusting agent and a pH adjusting agent may be used.

The heavy metal concentration adjusting agent is not particularly limited, and a polyvalent metal compound or metal element can be used. Specific examples include water-soluble polyvalent metal salts such as vanadium trichloride oxide, vanadium trichloride, vanadyl oxalate, vanadyl sulfate, vanadic acid anhydride, ammonium methavanadate, hypovanadous ammonium sulfate $[(NH_4)2SO_4 \cdot VSO_4 \cdot 6H_2O]$, vanadous ammonium sulfate $[(NH_4)V(SO_4)2 \cdot 12H_2O]$, copper acetate(II), copper(II), copper bromide(II), copper(II) acetylacetate, ammonium cupric chloride, ammonium copper chloride, copper carbonate, copper(II) chloride, copper(II) citrate, copper(II) formate, copper(II) hydroxide, copper nitrate, copper naphthenate, copper(II) oleate, copper maleate, copper phosphate, copper(II) sulfate, cuprous chloride, copper(I) cyanide, copper iodinate, copper(I) oxide, copper thiocyanate, iron acetylacetonate, ammonium ferric citrate, ferric ammonium oxalate, ferric ammonium sulfate, ammonium iron(II) sulfate, iron citrate, iron fumarate, iron maleate, ferrous lactate, ferric nitrate, iron pentacarbonyl, ferric phosphate, and ferric pyrophosphate; polyvalent metal oxide such as vanadium pentoxide, copper(II) oxide, ferrous oxide, and ferric oxide; polyvalent metal sulfides such as iron(III) sulfide, iron(II) sulfide, and copper sulfide; copper powder; and iron powder.

In the method for producing the copolymer of the present invention, the resulting (meth)acrylic acid-based copolymer preferably has a heavy metal ion concentration of 0.05 to 10 ppm, so that it is preferred to add a suitable amount of the heavy metal concentration adjusting agent as needed.

<Polymerization Solvent>

In the method for producing the copolymer of the present invention, the monomers are usually polymerized in a solvent. A solvent used in the polymerization system is preferably an aqueous solvent such as water, alcohol, glycol, glycerin, or polyethylene glycol. Water is particularly preferred. These solvents may be used alone or in combination of two or more thereof. In addition, in order to improve solubility of the monomers in a solvent, an organic solvent may be suitably added as long as it does not adversely affect polymerization of the monomers.

Specifically, one or more of the following are suitably selected as the organic solvent(s): lower alcohols such as methanol and ethanol; amides such as dimethylformaldehyde; and ethers such as diethylether and dioxane.

The amount of the solvent used is 40 to 200% by mass, preferably 45 to 180% by mass, more preferably 50 to 150% by mass, relative to the total amount of the monomers. If the amount of the solvent used is less than 40% by mass, the molecular weight tends to increase. In contrast, if the amount of the solvent used is more than 200% by mass, the concentration of the produced (meth)acrylic acid-based copolymer will be low, and the solvent may have to be removed in some cases. A large portion of the solvent or the entire solvent may be fed into a reaction vessel at an early stage of polymerization. Alternatively, for example, a portion of the solvent may be adequately added (dropped) singly to the reaction system during polymerization, or may be adequately added (dropped) to the reaction system during polymerization together with solutions of the monomer component, initiator component, and other additives dissolved in advance in a solvent.

<Polymerization Temperature>

The polymerization temperature to polymerize the monomer is not particularly limited. The polymerization temperature is preferably 50° C. or higher, more preferably 70° C. or higher, for efficient production of the polymer. At the same time, the polymerization temperature is preferably 99° C. or lower, more preferably 95° C. or lower. If the polymerization temperature is lower than 25° C., the molecular weight and impurities will increase. In addition, polymerization will take too long a time, thus reducing the productivity. Meanwhile, the polymerization temperature is preferably 99° C. or lower so that the generation of a large amount of sulfur dioxide due to decomposition of the bisulfite (salt) used as the initiator system can be suppressed. The term "polymerization temperature" as used herein refers to the temperature of a reaction solution in the reaction system.

In particular, in the case of a method in which polymerization is initiated at room temperature (initiation at room temperature), polymerization for 180 minutes per batch (180-minute technique), for example, should be carried out in such a manner that the polymerization temperature reaches a set temperature in 70 minutes, preferably in 0 to 50 minutes, more preferably in 0 to 30 minutes (the temperature is not limited as long as it is within the range specified above, yet, it is preferably 70° C. to 90° C., more preferably about 80° C. to 90° C.). After that, it is preferred to maintain the set temperature until polymerization is complete. If the heating time is outside the above range, the molecular weight of the resulting (meth)acrylic acid-based copolymer tends to increase. The above example is a case where the polymerization time is 180 minutes. In the case where the polymerization time is different, it is preferred to set the heating time in such a manner that the ratio of heating time to polymerization time is the same as described above with reference to the above example.

<Pressure and Reaction Atmosphere of Reaction System>

The pressure in the reaction system during polymerization of the monomers is not particularly limited. Polymerization may be carried out under ordinary pressure (atmospheric pressure), reduced pressure, or increased pressure. Preferably, in the case of using a bisulfite (salt) as the initiator system, polymerization is carried out under ordinary pressure or in a hermetically sealed reaction system under increased pressure in order to prevent the emission of sulfur dioxide during polymerization and to allow a decrease in the molecular weight. In addition, polymerization under ordinary pressure (atmospheric pressure) requires no additional pressure device or pressure reducing device, and there is also no need to use a pressure-proof reaction vessel or pipe. Thus, polymerization under ordinary pressure (atmospheric pressure) is preferred in terms of production cost. In other words, optimum pressure conditions may be suitably set according to the intended use of the resulting (meth)acrylic acid-based copolymer.

The atmosphere in the reaction system may be an air atmosphere but is preferably an inert atmosphere. For example, the system is preferably purged with an inert gas such as nitrogen before initiation of polymerization. This can prevent a situation where an atmospheric gas (such as oxygen gas) in the reaction system is dissolved in the liquid phase and acts as the polymerization inhibitor. As a result, it is possible to prevent deactivation of the initiator (such as a persulfate) and a decrease in the effective concentration, and thus enables a further decrease in the molecular weight.

<Degree of Neutralization During Polymerization>

In the production method of the present invention, the monomers are preferably polymerized under acidic conditions. Polymerization under acidic conditions can suppress an increase in the viscosity of the aqueous solution in the polymerization system and can successfully produce a low molecular weight (meth)acrylic acid-based copolymer. Moreover, because polymerization can proceed at higher concentrations compared to conventional methods, the production efficiency can be improved significantly. In particular, with a low degree of neutralization (0 to 30% by mole) of carboxylic acid during polymerization, the effect accompanied by a reduced amount of the initiator can be synergistically enhanced, markedly improving the effect of reducing impurities. Further, the pH of the reaction solution at 25° C. during polymerization is preferably adjusted to 1 to 6. Polymerization under such acidic conditions allows a one-step polymerization at high concentrations. Thus, it is possible to dispense with a concentration step that may be necessary in conventional production methods. This results in a significantly improved productivity of the (meth)acrylic acid-based copolymer and can suppress an increase in the production cost.

In regard to the acidic conditions, the pH of the reaction solution at 25° C. during polymerization is 1 to 6, preferably 1 to 5, more preferably 1 to 4. If the pH is less than 1, for example, use of the bisulfite (salt) as the initiator system may cause the generation of sulfur dioxide and corrosion of a device. In contrast, if the pH is more than 6, use of a bisulfite (salt) as the initiator system tends to decrease the efficiency of the bisulfite (salt) and increase the molecular weight.

Examples of the pH adjusting agent for adjusting the pH of the reaction solution during polymerization include alkali metal hydroxides such as sodium hydroxide and potassium hydroxide; alkali earth metal hydroxides such as calcium hydroxide and magnesium hydroxide; and salts of organic amines such as ammonia, monoethanolamine, and triethanolamine. These examples may be used alone or in combination of two or more. Among these, alkali metal hydroxides such as sodium hydroxide and potassium hydroxide are preferred, and sodium hydroxide is particularly preferred. Herein, each of these agents may be simply referred to as a "pH adjusting agent" or "neutralizer".

The degree of neutralization of the carboxylic acid during polymerization is 0 to 30% by mole, preferably 1 to 25% by mole, more preferably 2 to 23% by mole. If the degree of neutralization of the carboxylic acid during polymerization is in the above range, copolymerization can be optimized and thus a polymer with reduced impurities and excellent calcium ion trapping ability and calcium carbonate dispersing capacity can be produced. In addition, an increase in the viscosity of the aqueous solution in the polymerization system is prevented, and a low molecular weight polymer can thus be successfully produced. Moreover, because polymerization can proceed at higher concentrations compared to conventional methods, the production efficiency can be improved significantly. In contrast, if the degree of neutralization of the carboxylic acid during polymerization is more than 25% by mole, the chain transfer efficiency of the bisulfite (salt) may decrease, resulting in an increased molecular weight. In addition, the viscosity of the aqueous solution in the polymerization system increases significantly as polymerization proceeds, and as a result, the molecular weight of the resulting polymer may increase. Further, the effect accompanied by a decrease in the degree of neutralization cannot be fully exhibited, which may cause difficulties in significantly reducing impurities.

The method for neutralizing the carboxylic acid is not particularly limited. For example, a salt of a (meth)acrylic acid such as sodium (meth)acrylate may be used as a part of raw materials, or an alkali metal hydroxide such as sodium hydroxide may be used as a neutralizer to neutralize the carboxylic acid during polymerization. These may be used in combination. In addition, the neutralizer to neutralize the carboxylic acid may be added in a solid form, or the neutralizer may be a solution dissolved in an adequate solvent, preferably an aqueous solution dissolved in water.

If the neutralizer is an aqueous solution, the concentration of the aqueous solution is 10 to 60% by mass, preferably 20 to 55% by mass, more preferably 30 to 50% by mass. If the concentration of the aqueous solution is less than 10% by mass, the concentration of the resulting product will be low, which creates difficulties in transportation and storage. In contrast, if the concentration is more than 60% by mass, deposition may occur and the viscosity will increase, which creates difficulties in delivery of the liquid.

<Adding Conditions of Raw Materials>

In polymerization, preferably, the monomers, polymerization initiator, chain transfer agent, and other additives are dissolved in advance in an adequate solvent (preferably, the same solvent as that into which these components are dropped) to obtain a monomer solution, an initiator solution, a chain transfer agent solution, and a solution of other additives; and these solutions are continuously dropped over a predetermined dropping time to a solvent (preferably an aqueous solvent) fed into a reaction vessel (the temperature of the solvent is adjusted to a predetermined temperature, if necessary) for polymerization. A portion of the solvent may be dropped into the reaction system at a later time, separately from the solvent initially fed into the vessel in the reaction system in advance.

The production method of the present invention is not limited to those described above. For example, in regard to a dropping method, the solutions may be continuously dropped, or the solutions may be divided into small portions and dropped in an intermittent manner. One or more monomers may be partially or fully fed into the vessel at an early stage (in other words, one or more monomers may be partially dropped or fully dropped at a given time at the initiation of polymerization). In addition, the dropping rate (dropping amount) of one or more monomers may be constant (constant amount) throughout from the start to the end of dropping, or may be varied over time depending on the polymerization temperature and the like. All the components to be dropped may be dropped in a different manner. For example, the start time and the finish time may be shifted for each component to be dropped, or the dropping time may be shortened or extended. In this manner, the production method of the present invention can be suitably modified as long as the effects of the present invention are not impaired. In addition, in the case of dropping each component in the form of a solution, the solution to be dropped may be heated to a substantially same temperature as the polymerization temperature of the reaction system. This reduces temperature fluctuations and facilitates temperature adjustment when maintaining the polymerization temperature at a constant temperature.

In regard to the dropping time of the monomers during polymerization, dropping of the monomer (A) is usually finished 1 to 50 minutes, preferably 1 to 40 minutes, more preferably 1 to 30 minutes before dropping of the monomer (B) is finished.

In the case of using a bisulfite (salt) as the initiator system, the molecular weight at an early stage of polymerization significantly affects the final molecular weight. Thus, in order to reduce the molecular weight at an early stage of polymerization, 5 to 40% by mass of the bisulfite (salt) or its solution is added (dropped) usually within 60 minutes, preferably 30 minutes, more preferably 10 minutes after the initiation of polymerization. This is particularly effective in the case where polymerization is initiated at room temperature, as described later.

In addition, among the components to be dropped during polymerization, the dropping time of the bisulfite (salt) or its solution, if used as the initiator system, is finished usually 1 to 30 minutes, preferably 1 to 20 minutes, more preferably 1 to 15 minutes before dropping of the monomer (B) is finished. Thereby, the amount of the bisulfite (salt) after completion of polymerization can be reduced, and the generation of sulfur dioxide and the formation of impurities due to the bisulfite (salt) can be efficiently and effectively suppressed. Thus, the amount of impurities resulting from dissolution of gas-phase sulfur dioxide in the liquid phase can be markedly reduced. Residual bisulfite (salt) after completion of polymerization causes generation of impurities, resulting in problems such as poor properties of the polymer and deposition of impurities during storage at low temperatures. Thus, it is preferred that the initiator system including the bisulfite (salt) be fully consumed, leaving no residue at the completion of polymerization.

In the case where dropping of the bisulfite (salt) (solution) can only be finished less than 1 minute before dropping of the monomer (B) is finished, the residual bisulfite (salt) may remain after completion of polymerization. For example, there is a case where dropping of the bisulfite (salt) or its solution and dropping of the monomer (B) are finished at the same time, and there is a case where dropping of the bisulfite (salt) (solution) is finished after dropping of the monomer (B) is finished. These cases tend to create difficulties in efficiently and effectively suppressing the generation of sulfur dioxide and the formation of impurities, and the residual initiator system may adversely affect the thermal stability of the resulting polymer. In contrast, in the case where dropping of the bisulfite (salt) or its solution is finished more than 30 minutes before dropping of the monomer (B) is finished, the bisulfite (salt) will have been consumed before completion of polymerization. Thus, the molecular weight tends to increase. In addition, the dropping rate of the bisulfite (salt) is faster than the dropping rate of the monomer (B) during polymerization and thus a larger amount of the bisulfite (salt) is dropped in a shorter time. This tends to result in a large amount of impurities and sulfur dioxide during dropping.

In addition, among the components to be dropped during polymerization, dropping of a persulfate (solution) in the case where a bisulfite (salt) is used as the initiator system is finished usually 1 to 30 minutes, more preferably 1 to 25 minutes, still more preferably 1 to 20 minutes after dropping of the monomer (B) is finished. If dropping of the persulfate (solution) is finished 1 to 30 minutes after dropping of the monomer (B) is finished, the amount of the residual monomer component after completion of polymerization can be reduced, and thus the amount of impurities due to residual monomers can be markedly reduced.

In the case where dropping of the persulfate (solution) can only be finished less than 1 minute after dropping of the monomer (B) is finished, the monomer component may remain after completion of polymerization. For example, there is a case where dropping of the persulfate (solution) and dropping of the monomer (B) are finished at the same time, and there is a case where dropping of the persulfate (solution) is finished before dropping of the monomer (B) is finished. These cases tend to create difficulties in efficiently and effectively suppressing the formation of impurities. In contrast, in the case where dropping of the persulfate (solution) is finished more than 30 minutes after dropping of the monomer (B) is finished, the persulfate or its decomposed product may remain after completion of polymerization and form impurities.

<Polymerization Time>

Even if polymerization is carried out at a low polymerization temperature using a bisulfite (salt) as the initiator system, it is still important to suppress the generation of sulfur dioxide and the formation of impurities. Thus, the total dropping time during polymerization is usually as long as 150 to 600 minutes, more preferably 160 to 450 minutes, still more preferably 180 to 300 minutes. If the total dropping time is less than 150 minutes, the effects by the persulfate solution and the bisulfite (salt) solution added as the initiator system tend to be low. This tends to reduce the amount of sulfur-containing group such as a sulfonic acid group to be introduced into at least one end of the main chain of the resulting (meth)acrylic acid-based copolymer. As a result, the weight average molecular weight of the polymer tends to increase. In addition, dropping the initiator system into the reaction system in a short period of time may result in an excess amount of the bisulfite (salt). This may cause a situation where such an excess amount of the bisulfite (salt) is decomposed, resulting in generation of sulfur dioxide which is discharged from the system or formation of impurities. Polymerization at a low polymerization temperature using a specific small amount of initiator tends to improve the above situation. In contrast, if the total dropping time is more than 600 minutes, the generation of sulfur dioxide can be suppressed, resulting in a polymer having excellent properties. However, the productivity of the (meth)acrylic acid-based copolymer may be reduced, and the application thereof may be limited. The term "total dropping time" as used herein refers to the period from the time to start dropping the first component or components to be dropped until the completion of dropping of the last component or components to be dropped.

<Polymerization Concentration>

The solids concentration in the aqueous solution at the completion of dropping of all the amounts of the monomers, polymerization initiator, and chain transfer agent (in other words, the solids concentration of the monomers, polymerization initiator, and chain transfer agent after the completion of polymerization) is preferably 35% by mass or more, more preferably 40 to 70% by mass, and still more preferably 42 to 65% by mass. If the solids concentration at the completion of polymerization is 35% by mass or more, a one-step polymerization can be carried out at high concentrations. Thus, a low molecular weight (meth)acrylic acid-based copolymer can be efficiently obtained. For example, it is possible to dispense with a concentration step that may be necessary in conventional production methods. Thus, the method of the present invention can significantly enhance the production efficiency. This results in a significantly improved productivity of the (meth)acrylic acid-based copolymer and can suppress an increase in the production cost.

If the solids concentration is less than 35% by mass, the productivity of the (meth)acrylic acid-based copolymer may not be significantly improved. For example, it will be difficult to dispense with the concentration step.

A high solids concentration in the polymerization system tends to significantly increase the viscosity of the reaction solution along with the progress of polymerization, and thus the resulting polymer tends to have a significantly high weight average molecular weight. However, if the polymerization is carried out in the acidic side (the pH at 25° C. is 1 to 6 and the degree of neutralization of the carboxylic acid is within the range of 0 to 30% by mole), an increase in the viscosity of the reaction solution along with the progress of polymerization can be suppressed. Thus, a low molecular weight polymer can still be obtained by polymerization at high concentrations, significantly increasing the production efficiency of the polymer.

<Aging Step>

The method for producing the polymer of the present invention may include an aging step after all the raw materials are added in order to increase the polymerization ratio of the monomers or for other purposes. The aging time is usually 1 to 120 minutes, preferably 5 to 90 minutes, and more preferably 10 to 60 minutes. If the aging time is less than 1 minute, the monomer component may remain due to insufficient aging, forming impurities due to the residual monomers, which tend to reduce the properties of the polymer. In contrast, if the aging time is more than 120 minutes, the polymer solution tends to be darker in color.

In addition, a preferred temperature of the polymer solution during the aging step is in the range of the above polymerization temperature. Thus, the temperature in this step may also be maintained at a constant temperature (preferably, the temperature at the completion of dropping), or may be varied over time during aging.

<Post-Polymerization Step>

In the method for producing the (meth)acrylic acid-based copolymer of the present invention, polymerization is preferably carried out under acidic conditions as described above. Thus, the degree of neutralization (final degree of neutralization of the carboxylic acid) of the carboxylic acid in the resulting (meth)acrylic acid-based copolymer may be adjusted within a predetermined range after completion of polymerization, as needed, by suitably adding an adequate alkaline component as a post-process.

The final degree of neutralization should not be particularly limited because it varies depending on the use. In particular, the final degree of neutralization of the carboxylic acid used as an acidic polymer is preferably 0 to 75% by mole, more preferably 0 to 70% by mole. The final degree of neutralization of the carboxylic acid used as a neutral or alkaline polymer is preferably 75 to 100% by mole, more preferably 85 to 99% by mole. In addition, if the final degree of neutralization of the carboxylic acid used as a neutral or alkaline polymer is more than 99% by mole, the polymer aqueous solution tends to be darker in color.

Examples of the alkaline component include alkali metal hydroxides such as sodium hydroxide and potassium hydroxide; alkali earth metal hydroxides such as calcium hydroxide and magnesium hydroxide; organic amines such as ammonia, monoethanolamine, diethanolamine, and triethanolamine. These examples of the alkaline component may be used alone or in combination of two or more.

In addition, in the case where the carboxylic acid is used in the acidic state without being neutralized, toxic sulfur dioxide may remain in the reaction system and its atmosphere because the reaction system is acidic. In such a case, preferably, a peroxide such as hydrogen peroxide is added to decompose sulfur dioxide, or air or nitrogen gas is introduced (blown) to expel sulfur dioxide.

<Other Production Conditions>

The (meth)acrylic acid-based copolymer of the present invention may be produced in a batch or continuous manner.

<Copolymer Composition of the Present Invention Composition>

The copolymer composition of the present invention composition essentially contains the (meth)acrylic acid-based copolymer of the present invention. The copolymer composition may contain only the copolymer of the present invention, or may contain at least one selected from a polymerization initiator residue, residual monomer, by-product of polymerization, or water, in addition to the copolymer. The copolymer composition of the present invention preferably contains 1 to 100% by mass of the copolymer of the present invention relative to 100% by mass of the copolymer composition of the present invention. One preferred embodiment of the copolymer composition contains 35 to 60% by mass of the copolymer and 40 to 65% by mass of water. A more preferred embodiment contains 40 to 60% by mass of the copolymer and 40 to 60% by mass of water.

Since the copolymer composition of the present invention tends to exhibit improved gel resistance under high hardness conditions, the amount of the monomer represented by the formula (1) (usually, the amount of the residual monomer represented by the formula (1)) is preferably 10000 ppm or less, more preferably 5000 ppm or less, relative to the total amount of the copolymer composition.

The amount of the acrylic acid (salt) in the copolymer composition of the present invention is preferably 0 ppm or more and 50 ppm or less relative to the total amount of the copolymer composition.

The amount of the bisulfite (salt) in the copolymer composition of the present invention is preferably 0 ppm or more and 50 ppm or less relative to the total amount of the copolymer composition. The residual amount of the bisulfite (salt) in the copolymer composition can be determined as follows: for example, hydrogen peroxide in an amount relative to the residual amount of the bisulfite (salt) such as sodium hydrogen sulfite is added to allow hydrogen peroxide in an amount equivalent to the amount of the bisulfite (salt) to be consumed in redox reactions, and the residual amount of hydrogen peroxide is measured, whereby the residual amount of the bisulfite (salt) can be determined from the amount of the consumed hydrogen peroxide. The amount of hydrogen peroxide in the polymer composition can be determined as follows: for example, iodine is generated through redox reactions between potassium iodide and hydrogen peroxide in the presence of sulfuric acid, and the generated iodine is titrated into a sodium thiosulfate aqueous solution having a known concentration, whereby the amount of hydrogen peroxide can be determined.

<Use of the Copolymer or Copolymer Composition of the Present Invention>

The copolymer of the present invention (or the copolymer composition) can be used, for example, as a water treatment agent (such as an anti-scaling agent or anticorrosive), fiber treatment agent, dispersant, bleach stabilizer, metal ion sealing agent, thickener, binder (various kinds), emulsifier, skin care agent, or hair care agent. The use of the copolymer of the present invention in these agents is still another embodiment of the present invention.

<Water Treatment Agent>

The copolymer (or the copolymer composition) of the present invention can be used in a water treatment agent. The water treatment agent may contain another additive, as needed, such as a polyphosphate, phosphonate, anticorrosive, slime controlling agent, or chelating agent.

The water treatment agent is effective in preventing scale, for example, in cooling water circulation systems, boiler water circulation systems, seawater desalination devices, reverse osmosis membrane treatment devices, pulp digesters, and black liquor concentrators. In addition, the water treatment agent may contain any appropriate water-soluble polymer as long as it does not impair the properties and the effect of the fiber treatment agent.

<Fiber Treatment Agent>

The copolymer of the present invention (or the copolymer composition) can be used in a fiber treatment agent. The fiber treatment agent contains at least one selected from the group consisting of a dye, a peroxide, and a surfactant, and the copolymer of the present invention (or the copolymer composition).

The amount of the copolymer of the present invention in the fiber treatment agent is preferably 1 to 100% by mass, more preferably 5 to 100% by mass, relative to the total amount of the fiber treatment agent. In addition, the fiber treatment agent may contain any appropriate water-soluble polymer as long as it does not impair the properties and the effect of the fiber treatment gent.

An example composition of the fiber treatment agent according to a representative embodiment of the present invention is described below. This fiber treatment agent can be used in a refining, dying, bleaching, or soaping step in a fiber treatment. Examples of dyes, peroxides, and surfactants include those commonly used in fiber treatment agents.

The composition ratio between the copolymer composition of the present invention and at least one selected from the group consisting of a dye, a peroxide, and a surfactant is as follows: for example, in order to obtain a fiber having improved whiteness and color fastness as well as reduced color unevenness, a composition containing at least one selected from the group consisting of a dye, a peroxide, and a surfactant in an amount of 0.1 to 100 parts by mass per part by mass of the copolymer of the present invention (in terms of pure fiber treatment agent) is preferably used as the fiber treatment agent.

The fiber treatment agent can be used in any appropriate fiber. Examples include cellulose-based fibers such as cotton and hemp; chemical fibers such as nylon and polyester; animal fibers such as wool and silk; semi-synthetic fibers such as artificial silk; and textile fabrics and blended yarn fabrics of these fibers.

In the case where the fiber treatment agent is used in a refining step, the fiber treatment agent preferably contains the copolymer composition of the present invention, an alkaline agent, and a surfactant. In the case where the fiber treatment agent is used in a bleaching step, the fiber treatment agent preferably contains the copolymer composition of the present invention, a peroxide, and a silicic acid-based chemical such as sodium silicate as a decomposition inhibitor of an alkaline bleaching agent.

<Inorganic Pigment Dispersant>

The copolymer of the present invention (or the copolymer composition) can be used in an inorganic pigment dispersant. The amount of the copolymer of the present invention in an inorganic pigment dispersant of the present invention is preferably 5 to 100% by mass relative to the total amount of the inorganic pigment dispersant.

The inorganic pigment dispersant of the present invention may contain other additives, as needed. Examples include any appropriate water-soluble polymer such as polyvinyl alcohol, condensed phosphoric acids and their salts, and phosphonic acids and their salts. The inorganic pigment dispersant of the present invention may contain a solvent such as water.

The inorganic pigment dispersant exhibits excellent properties as a dispersant for inorganic pigments such as heavy or light calcium carbonate and clay used for paper coating. For example, a small amount of the inorganic pigment dispersant is added to disperse inorganic pigments in water, whereby highly concentrated inorganic pigment slurry such as highly concentrated calcium carbonate slurry having low viscosity, high fluidity, and excellent long-term stability of these properties can be produced.

In the case of using the inorganic pigment dispersant as a dispersant for inorganic pigments, the amount of the inorganic pigment dispersant is preferably 0.05 to 2.0 parts by mass per 100 parts by mass of inorganic pigments. The use of the inorganic pigment dispersant in an amount within the above range provides a sufficient dispersion effect proportional to the amount added, which is advantageous in terms of the cost.

EXAMPLES

The present invention is described in further detail below with reference to examples, but the present invention is not limited to these examples. It should be noted that the terms "part(s)" and "%" refer to "part(s) by weight" and "wt %", respectively, unless otherwise stated.

In addition, quantitative determination of the monomers, measurement of the weight average molecular weight of the copolymer, and evaluations were carried by the following methods.

<Quantitative Determination of the Monomers>

The amount of the monomers and the like was determined by liquid chromatography under the following conditions.
Device: L-7000 series available from Hitachi, Ltd.
Detector: L-7400 UV detector available from Hitachi, Ltd.
Column: Shodex RSpak DE-413L available from Showa Denko K. K.
Flow rate: 1.0 ml/min
Column temperature: 40° C.
Mobile phase: 0.1% aqueous solution of phosphoric acid <Conditions for Measurement of Weight Average Molecular Weight>

The molecular weight of the polymer was measured by gel permeation chromatography under the following conditions.
Device: HLC-8320 GPC available from Tosoh Corporation
Detector: RI
Column: Shodex Asahipak GF-310-HQ, GF-710-HQ, and GF-1G available from Showa Denko K. K.
Column temperature: 40° C.
Flow rate: 0.5 ml/min
Standard curve: Polyacrylic acid standard available from Sowa Kagaku Co., Ltd.
Eluent: 0.1N aqueous solution of sodium acetate <Measurement of Sulfonic Acid Group at the End>

A polymer (aqueous solution) with a pH adjusted to 1 was dried under reduced pressure at room temperature to evaporate water, and the $^1$H NMR analysis was then carried out using heavy water as a solvent to confirm introduction of a sulfonic acid group at the end(s) of the main chain of the polymer by the presence of a peak at 2.7 ppm derived from the group.

<Measurement of Solids Content>

The copolymer of the present invention with an adjusted pH (1.0 g of the copolymer composition of the present invention with a pH adjusted to 7.0±0.1 with 48% NaOH to which 2.0 g of water was added) was left to stand for 1 hour in an oven heated at 170° C. for dry treatment. The solids content (%) and the volatile content (o) were calculated from the difference in mass before and after drying.

<Measurement of Gel Resistance>

The gel resistance was measured by the test mentioned above.

<Measurement of Calcium Ion Trapping Ability>

The calcium ion trapping ability was measured by the measurement method described above.

<Calcium Carbonate Dispersing Capacity>

The calcium carbonate dispersing capacity was measured by the measurement method described above.

Example 1

A 5-L separable flask made of SUS (stainless steel) 316 equipped with a thermometer, reflux condenser, and stirrer was fed with pure water (948.0 g) and heated to 87° C. under stirring (initial feeding).

Subsequently, under stirring, the following components were each dropped into the polymerization system maintained in a constant state at 87° C. through separate dropping nozzles: 1337.9 g of a 80% (by mass) aqueous solution of acrylic acid (hereinafter referred to as 80% AA); 426.6 g of a 40% (by mass) aqueous solution of 3-allyloxy-2-hydroxy-1-propanesulfonic acid sodium salt (hereinafter referred to as 40% HAPS); 156.5 g of a 15% (by mass) aqueous solution of sodium persulfate (hereinafter referred to as 15% NaPS); 232.5 g of a 35% (by mass) aqueous solution of sodium bisulfite (hereinafter referred to as 35% SBS); 81.9 g of a 48% aqueous solution of sodium hydroxide (hereinafter referred to as 48% NaOH); 11.3 g of a 0.6% aqueous solution of Mohr's salt (hereinafter referred to as 0.6% Mohr's salt) (the amount is 3 ppm in terms of the mass of iron (II) relative to the total feeding amount; the term "total feeding amount" as used herein refers to the mass of all the components fed not only during polymerization but also during a neutralization step after completion of polymerization); and 5.4 g of a 35% aqueous solution of hydrogen peroxide (hereinafter referred to as 35% HP). As for the dropping time, 80% AA was dropped for 180 minutes, 40% HAPS for 140 minutes, 35%

SBS for 175 minutes, 15% NaPS for 200 minutes, 48% NaOH for 180 minutes, 0.6% Mohr's salt in a lump sum, and 35% HP for 5 minutes. In addition, as for the dropping start time, first, dropping of 35% SBS was started, and then 5 minutes after that, dropping of 80% AA, 40% HAPS, 15% NaPS, and 48% NaOH was started; 15 minutes after dropping of 35% SBS was started, 0.6% Mohr's salt was fed in a lump sum; and 190 minutes after dropping of 35% SBS was started, dropping of 35% HP was started. As for 40% HAPS, 85.4 g thereof was first dropped continuously at a constant dropping rate for the first 15 minutes (0 to 15 minutes) after dropping of 40% HAPS was started, and the remaining 341.2 g thereof was subsequently dropped at a constant dropping rate after the 15 minutes until 140 minutes after dropping of 40% HAPS was started. Each of 80% AA, 15% NaPS, 35% SBS, 48% NaOH, and 35% HP was dropped continuously at a constant dropping rate during the dropping time.

After completion of dropping, the reaction solution was maintained at 87° C. for additional 60 minutes for aging, whereby polymerization was completed. In this manner, the copolymer composition of the present invention (polymer composition (1)) was obtained (a copolymer included is referred to as a polymer (1)).

The residual amount of sodium bisulfite in the polymer composition (1) was 0 (detection limit or less).

Example 2

A same procedure was repeated as in Example 1 except that the amount of pure water was changed to 979.4 g, 80% AA to 1362.6 g, 40% HAPS to 434.6 g, 15% NaPS to 159.4 g, 35% SBS to 163.9 g, 48% NaOH to 83.4 g, and 35% HP to 5.5 g; and that 40% HAPS was dropped for 155 minutes during which 87.0 g of 40% HAPS was first dropped from 0 to 15 minutes after dropping of 40% HAPS was started and the remaining 347.6 g thereof was subsequently dropped from 15 to 155 minutes after dropping of 40% HAPS was started. Thereby, a polymer composition (2) (a copolymer included is referred to as a polymer (2)).

Example 3

A same procedure was repeated as in Example 2 except that a 2.5-L separable flask was used, and the amount of pure water was changed to 539.6 g, 80% AA to 720.0 g, 40% HAPS to 229.5 g, 15% NaPS to 84.2 g, 35% SBS to 43.3 g, 48% NaOH to 0 g, 35% HP to 6.0 g, and 0.6% Mohr's salt to 5.7 g; and that dropping of 35% SBS, 80% AA, 40% HAPS, and 15% NaPS was started at the same time; 0.6% Mohr's salt was fed in a lump sum 10 minutes after dropping of AA and the like was started; dropping of 35% HP was started 185 minutes after dropping of AA and the like was started; 45.9 g of 40% HAPS was first dropped from 0 to 15 minutes after dropping of 40% HAPS was started, and the remaining 183.6 g thereof was subsequently dropped from 15 to 165 minutes after dropping of 40% HAPS was started; and 4.8 g of 35% SBS was first dropped 0 to 15 minutes after dropping of 35% SBS was started, and the remaining 38.5 g of 35% SBS was added 15 to 170 minutes after dropping of 35% SBS was started. Thereby, a polymer composition (3) was obtained (a copolymer included is referred to as a polymer (3)).

Example 4

A same procedure was repeated as in Example 2 except that the amount of pure water was changed to 1018.1 g, 80% AA to 1393.3 g, 40% HAPS to 444.3 g, 15% NaPS to 163.0 g, 35% SBS to 79.2 g, 48% NaOH to 85.3 g, and 35% HP to 5.6 g; and that 40% HAPS was dropped for 165 minutes during which 88.9 g of 40% HAPS was first dropped from 0 to 15 minutes after dropping of 40% HAPS was started and the remaining 355.4 g thereof was subsequently dropped from 15 to 165 minutes after dropping of 40% HAPS was started. Thereby, a polymer composition (4) was obtained (a copolymer included was referred to as a polymer (4)).

Comparative Example 1

A 5-L separable flask made of SUS (stainless steel) 316 equipped with a thermometer, reflux condenser, and stirrer was fed with pure water (622.7 g) and Mohr's salt (0.0171 g) and heated to 85° C. under stirring (initial feeding).

Subsequently, under stirring, the following components were each dropped into the polymerization system maintained in a constant state at 85° C. through separate dropping nozzles: 80% AA (900.0 g), 15% NaPS (46.2 g), and 35% SBS (125.7 g). As for the dropping time, 80% AA was dropped for 120 minutes, 15% NaPS for 180 minutes, and 35% SBS for 115 minutes. In addition, as for the dropping start time, dropping of all the solutions to be dropped was started at the same time. Each solution to be dropped was dropped continuously at a constant rate during the dropping time.

After completion of dropping, the reaction solution was maintained at 85° C. for additional 30 minutes for aging, and 35% HP (9.5 g) was then added to the reaction solution. In this manner, a comparative polymer composition (comparative polymer composition (1)) was obtained (a comparative polymer included is referred to as a comparative polymer (1)).

Comparative Example 2

A 2.5-L separable flask made of SUS (stainless steel) 316 equipped with a thermometer, reflux condenser, and stirrer was fed with pure water (461.3 g) and 40% HAPS (61.1 g), and heated under stirring to a boiling point reflux state (initial feeding).

Subsequently, under stirring, the following components were each dropped into the polymerization system in a boiling point reflux state through separate dropping nozzles: 80% AA (408.3 g), 40% HAPS (213.6 g), 15% NaPS (132.4 g), and 35% SBS (224.6 g). As for the dropping time, 80% AA was dropped for 180 minutes, 40% HAPS for 130 minutes, 15% NaPS for 200 minutes, and 35% SBS for 180 minutes. In addition, as for the dropping start time, dropping of all the solutions to be dropped was started at the same time. As for 15% NaPS, 62.6 g thereof was first dropped continuously at a constant dropping rate for the first 130 minutes (0 to 130 minutes) after the start of dropping, and the remaining 69.8 g thereof was subsequently dropped at a constant dropping rate after the 130 minutes until 200 minutes after the start of dropping. Each of 80% AA, 40% HAPS, and 35% SBS was dropped continuously at a constant dropping rate during the dropping time.

After completion of dropping, the reaction solution was maintained in the boiling point reflux state for additional 30 minutes for aging, whereby polymerization was completed. In this manner, a comparative copolymer composition (comparative polymer composition (2)) was obtained (a comparative copolymer included is referred to as a comparative polymer (2)).

Comparative Example 3

A 5-L separable flask made of SUS (stainless steel) 316 equipped with a thermometer, reflux condenser, and stirrer was fed with pure water (906.8 g) and heated to 87° C. under stirring (initial feeding).

Subsequently, under stirring, the following components were each dropped into the polymerization system maintained in a constant state at 87° C. through separate dropping nozzles: 80% AA (1305.2 g), 40% HAPS (416.2 g), 15% NaPS (152.7 g), 35% SBS (322.8 g), 48% NaOH (79.9 g), 0.6% Mohr's salt (11.3 g), and 35% HP (5.2 g). As for the dropping time, 80% AA was dropped for 180 minutes, 40% HAPS for 155 minutes, 35% SBS for 175 minutes, 15% NaPS for 200 minutes, 48% NaOH for 180 minutes, 0.6% Mohr's salt in a lump sum, 35% HP for 5 minutes. In addition, as for the dropping start time, first, dropping of 35% SBS was started, and then 5 minutes after that, dropping of 80% AA, 40% HAPS, 15% NaPS, and 48% NaOH was started; 15 minutes after dropping of 35% SBS was started, 0.6% Mohr's salt was fed in a lump sum; and 190 minutes after dropping of 35% SBS was started, dropping of 35% HP was started. As for 40% HAPS, 83.3 g thereof was first dropped continuously at a constant dropping rate for the first 15 minutes (0 to 15 minutes) after dropping of 40% HAPS was started, and the remaining 332.9 g thereof was subsequently dropped at a constant dropping rate after the 15 minutes until 155 minutes after dropping of 40% HAPS was started. Each of 80% AA, 15% NaPS, 35% SBS, 48% NaOH, and 35% HP was dropped continuously at a constant dropping rate during the dropping time.

After completion of dropping, the reaction solution was maintained at 87° C. for additional 60 minutes for aging, whereby polymerization was completed. In this manner, a comparative copolymer composition (comparative polymer composition (3)) was obtained (a comparative copolymer included is referred to as a comparative polymer (3)).

Comparative Example 4

A 2.5-L separable flask made of SUS (stainless steel) 316 equipped with a thermometer, reflux condenser, and stirrer was fed with pure water (150.0 g) and heated under stirring to a boiling point reflux state (initial feeding).

Subsequently, under stirring, the following components were each dropped into the polymerization system in a boiling point reflux state through separate dropping nozzles: 80% AA (19.8 g), 37% sodium acrylate (hereinafter referred to as 37% SA; 909.5 g), 40% HAPS (109.0 g), 15% NaPS (53.3 g), 35% HP (11.4 g), and pure water (100.0 g). As for the dropping time, 80% AA, 37% SA, pure water, and 35% HP were added for 120 minutes, 40% HAPS for 110 minutes, and 15% NaPS for 140 minutes. In addition, as for the dropping start time, dropping of all the solutions to be dropped was started at the same time. Each solution to be dropped was dropped continuously at a constant rate during the dropping time.

After completion of dropping, the reaction solution was maintained in the boiling point reflux state for additional 30 minutes for aging, whereby polymerization was completed. In this manner, a comparative copolymer composition (comparative polymer composition (4)) was obtained (a comparative copolymer included is referred to as a comparative polymer (4)).

Example 5

Each of the polymers (1) to (4) and the comparative polymers (1) to (4) with a pH adjusted to 7.0±0.1 with 48% NaOH was used to measure the molecular weight and to evaluate the gel resistance (degree of gelation resistance), calcium trapping ability (Ca trapping ability), and calcium carbonate dispersing capacity by the methods described above. In addition, each polymer and each comparative polymer were examined for the presence of a sulfonic acid (salt) group at the end (s) of the main chain; and each polymer composition and each comparative polymer composition were examined for the residual amount of HAPS (relative to the aqueous solution) and the residual amount of AA (relative to the aqueous solution). Table 1 shows the results. In Table 1, "Ca trapping ability" indicates the calcium ion trapping ability and "CaCO$_3$ dispersing capacity" indicates the calcium carbonate dispersing capacity.

TABLE 1

| | Ratio (mol %) of structural unit (a) | Mw | Mw/Mn | Degree of gelation resistance (absorbance) | Ca trapping ability (mg CaCO$_3$/g) | CaCO$_3$ dispersing capacity | Sulfonic acid (salt) group at the end(s) | Residual HAPS (ppm, wet weight) | Residual AA (ppm, wet weight) |
|---|---|---|---|---|---|---|---|---|---|
| Polymer (1) | 5.0 | 8,000 | 2.5 | 0.056 | 234 | 0.493 | Present | 900 | <10 |
| Polymer (2) | 5.0 | 12,000 | 2.7 | 0.041 | 245 | 0.586 | Present | 2,400 | 20 |
| Polymer (3) | 5.0 | 20,000 | 3.2 | 0.044 | 259 | 0.544 | Present | 1,700 | 10 |
| Polymer (4) | 5.0 | 25,500 | 3.3 | 0.038 | 254 | 0.442 | Present | 2,000 | 2 |
| Comparative polymer (1) | 0.0 | 9,000 | 2.5 | 0.569 | 266 | 0.290 | Present | 0 | <10 |
| Comparative polymer (2) | 10.0 | 5,000 | 2.2 | 0.002 | 163 | 0.419 | Present | 1,700 | 210 |
| Comparative polymer (3) | 5.0 | 5,000 | 2.2 | 0.053 | 199 | 0.437 | Present | 2,100 | 20 |
| Comparative polymer (4) | 5.0 | 12,500 | 3.3 | 0.08 | 242 | 0.537 | Absent | 800 | 50 |

The evaluation results clearly show that the copolymer of the present invention has excellent calcium ion trapping ability, calcium carbonate dispersing capacity, and gel resistance, compared to conventional polymers.

INDUSTRIAL APPLICABILITY

The copolymer of the present invention has excellent calcium ion trapping ability, calcium carbonate dispersing capacity, and gel resistance. Thus, the copolymer can exhibit excellent properties when used in additives such as water treatment agents (particularly, calcium carbonate precipitation inhibitors) and dispersants.

The invention claimed is:

1. A (meth)acrylic acid-based copolymer comprising, as essential structural units:
   a structural unit (a) derived from a monomer represented by the following formula (1) in an amount of 2% by mole or more and 9% by mole or less relative to 100% by mole of structural units derived from all monomers; and
   a structural unit (b) derived from a (meth)acrylic acid or a salt thereof in an amount of 91% by mole or more and 98% by mole or less relative to 100% by mole of structural units derived from all monomers,
wherein the copolymer contains a sulfonic acid group or a salt thereof at at least one end of the main chain and has a weight average molecular weight of 7000 to 100000,

[Chem. 1]

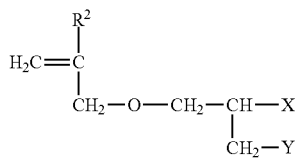

Formula (1)

wherein $R^2$ represents a hydrogen atom or a methyl group; and X and Y each independently represent a hydroxyl group or a sulfonic acid group or a salt thereof, with at least one of X and Y representing a sulfonic acid group or a salt thereof.

2. The (meth)acrylic acid-based copolymer according to claim 1,
wherein an amount of a structural unit (e) derived from another monomer other than the structural unit (a) and the structural unit (b) derived from a (meth)acrylic acid or a salt thereof, in the (meth)acrylic acid-based copolymer is 0% by mole relative to 100% by mole of structural units derived from all monomers.

3. A method for producing the (meth)acrylic acid-based copolymer as defined in claim 1, the method comprising: copolymerizing, as essential starting materials, a monomer represented by the following formula (1) in an amount of 2% by mole or more and 9% by mole or less relative to 100% by mole of all monomers, and a (meth)acrylic acid or a salt thereof, in an amount of 91% by mole or more and 98% by mole or less relative to 100% by mole of all monomers, in the presence of a bisulfite or a salt thereof,

[Chem. 2]

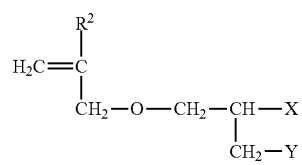

Formula (1)

wherein $R^2$ represents a hydrogen atom or a methyl group; and X and Y each independently represent a hydroxyl group or a sulfonic acid group or a salt thereof, with at least one of X and Y representing a sulfonic acid group or a salt thereof.

4. The (meth)acrylic acid-based copolymer according to claim 1, exhibiting a gel resistance of 0.070 or less, a calcium ion trapping ability of 200 to 500 mg $CaCO_3$/g, and a calcium carbonate dispersing capacity of 0.44 to 0.80.

5. The (meth)acrylic acid-based copolymer according to claim 4, exhibiting a gel resistance of 0.050 or less, a calcium ion trapping ability of 230 to 500 mg $CaCO_3$/g, and a calcium carbonate dispersing capacity of 0.53 to 0.80.

* * * * *